Nov. 3, 1936.　　　R. G. McCURDY　　　2,059,738
POWER TRANSMITTING APPARATUS
Filed June 19, 1926
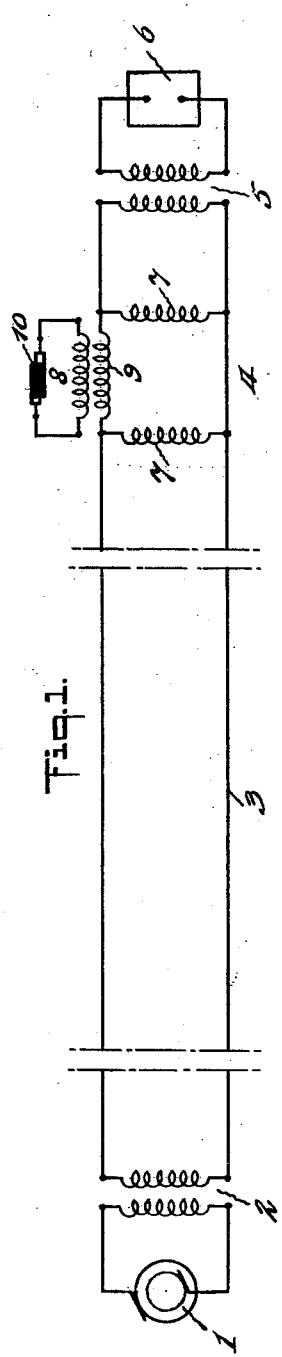
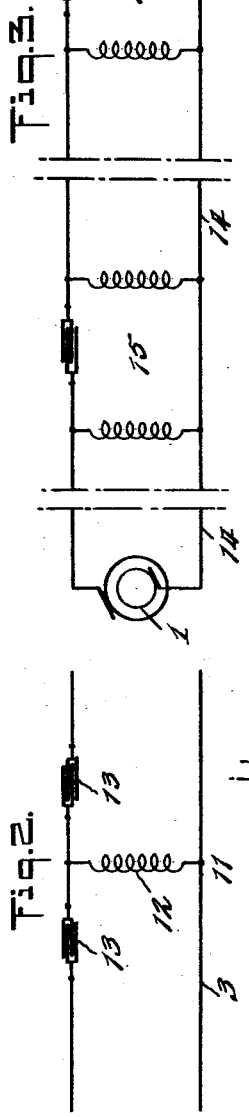
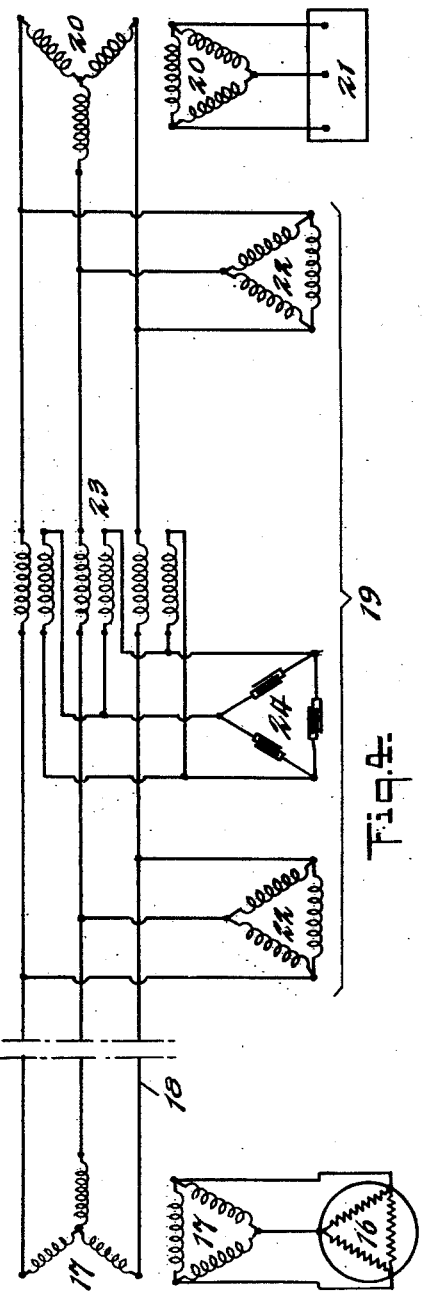
INVENTOR
Ralph G. McCurdy Patented Nov. 3, 1936

2,059,738

UNITED STATES PATENT OFFICE 2,059,738

POWER TRANSMITTING APPARATUS

Ralph Gordon McCurdy, Englewood, N. J.

Application June 19, 1926, Serial No. 117,180

8 Claims. (Cl. 172—246)

An important limitation to the amount of power which may be transmitted over long transmission lines by alternating voltages and currents, is the phase change which occurs between the two ends, caused by the series inductance and shunt capacitance of the line. By phase change is meant the displacement in phase of the line voltage at opposite ends of the line or the phase displacement of line current at opposite ends of the line. In order to transmit power over the line in varying amounts, as determined by the requirements of the load, with definite voltages at the two ends, correcting means must be provided. In present practice, these correcting means consist of synchronous apparatus whose excitations may be varied over a wide range and which may supply leading or lagging current to the system as may be necessary to transmit the power required by the load.

By my invention I propose to connect stationary apparatus to the line, such apparatus having a phase change at the particular frequency of voltage and current at which the power is being transmitted, which opposes the phase change caused by the transmission line. By suitably relating the constants of the correcting apparatus to the characteristics of the transmission line, the combination may be made to have, at a particular frequency, the characteristics of a much shorter transmission line, to function like a line having only resistance characteristics, or to behave as though the line had series capacitance and shunt inductance instead of series inductance and shunt capacitance.

Figure 1 is a diagram of a power transmitting system embodying my invention, Figure 2 is a diagram showing an alternative form of correcting apparatus, Figure 3 is a diagram showing a line and phase correcting means alternately disposed and Figure 4 is a diagram of a three-phase system, including the correcting apparatus of my invention.

As is well known in the art the characteristic impedance $Z_0$, and propagation constant, $\Gamma$, of a transmission line having series resistance, R, series inductance, L, shunt conductor G and shunt capacitance, C, per mile is given by the following relations:

$$Z_0 = \sqrt{\frac{R+j\omega L}{G+j\omega C}} \quad (1)$$

$$\Gamma = \sqrt{(R+j\omega L)(G+j\omega C)} = \alpha + j\beta \quad (2)$$

where $\omega = 2\pi f$ and $$j = \sqrt{-1}.$$

(1) may be rewritten $$Z_0 = \sqrt{\frac{L}{C}} \sqrt{\frac{1-j\frac{R}{\omega L}}{1-j\frac{G}{\omega C}}}. \quad (3)$$

On the assumption that $G^2/\omega^2 C^2$, $R^2/\omega^2 L^2$, and $GR/\omega^2 LC$ are small compared to 1, which is justifiable in the types of transmission line we are considering, $$Z_0 = \sqrt{\frac{L}{C}} \sqrt{1+j\frac{G}{\omega C}-j\frac{R}{\omega L}} \text{approx.} \quad (4)$$

or $$Z_0 = \sqrt{\frac{L}{C}} \left[1-j\frac{1}{2}\left(\frac{R}{\omega L}-\frac{G}{\omega C}\right)\right] \text{approx.} \quad (5)$$

(2) may be rewritten, $$\Gamma = \omega\sqrt{LC}\sqrt{\frac{RG}{\omega^2 LC}-1+j\left(\frac{R}{\omega L}\frac{G}{\omega C}\right)} = \alpha + j\beta \quad (6)$$

On the same assumptions as those used above in simplifying (3), $$\alpha = \frac{1}{2}\sqrt{LC}\left(\frac{RG}{CC}\right), \beta = \omega\sqrt{LC} \quad (7)$$

If instead of series inductance and shunt capacitance the line had series capacitance C' and shunt inductance L' per mile and series resistance R' and shunt conductance G' per mile, the characteristic impedance $Z_0'$ and propagation constant $\Gamma'$ per mile would be $$Z_0' = \sqrt{\frac{R'-j\frac{1}{\omega C'}}{G'-j\frac{1}{\omega L'}}} \quad (8)$$

$$\Gamma' = \sqrt{\left(R'-j\frac{1}{\omega C'}\right)\left(G'-j\frac{1}{\omega L'}\right)} = \alpha' + j\beta' \quad (9)$$

(8) may be rewritten $$Z_0' = \sqrt{\frac{L'}{C'}} \sqrt{\frac{1+jR'\omega C'}{1+jG'\omega L'}}. \quad (10)$$

On the assumption that $(R'\omega C')^2$, $(G'\omega L')^2$, and $R'G'\omega^2 L'C'$ are small compared to 1, $$Z_0' = \sqrt{\frac{L'}{C'}}\left\{1+j\frac{1}{2}(R'\omega C' - G'\omega L')\right\} \quad (11)$$

Similarly $$\Gamma' = \frac{1}{\omega\sqrt{L'C'}}\sqrt{R'G'\omega^2 L'C'-1-j(R'\omega C'+G'\omega L')} \quad (12)$$

On the same assumption as used in simplifying (10)

$$\alpha' = \frac{1}{2\sqrt{L'C'}}(R'C'+G'L'), \beta' = -\frac{1}{\omega\sqrt{L'C'}} \quad (12)$$

It will be seen by comparing Equations (10) and (12) with Equations (5) and (7) that the two types of line will have equal characteristic impedances and wave length constants per mile of equal magnitude and opposite sign when $$\omega\sqrt{LC} = \frac{1}{\omega\sqrt{L'C'}}, \qquad (13)$$

$$\sqrt{\frac{L}{C}} = \sqrt{\frac{L'}{C'}} \qquad (14)$$

and $$\left(\frac{R}{\omega L} - \frac{G}{\omega C}\right) = R'\omega C' - G'\omega L' \qquad (15)$$

from (13) and (14)

$$\omega L = \frac{1}{\omega C'}, \; \omega C = \frac{1}{\omega L'} \qquad (16)$$

substituting (16) in (15)

$$\frac{R' + R}{\omega L} = \frac{G' + G}{\omega C} \qquad (17)$$

It will be understood of course that since R and R' are both small compared to $\omega L$, and G and G' small compared to $\omega C$, considerable departure from Equation (17) may be permitted without appreciably affecting the equality of $Z_0$ and $Z_0'$ and $\beta$ and $-\beta'$.

It is well known in the art that when two lines of equal characteristic impedances and different propagation constants are connected together the relations among the voltages, currents, and powers at the two ends of the composite system may be determined by replacing the composite system by an equivalent uniform line with the same characteristic impedance and with a total propagation constant equal to the sum of the products of the propagation constants per unit length of the individual sections of the composite system times their respective lengths.

When a line of length D' having series capacitance and shunt inductance is connected to a transmission line of length D with series inductance and shunt capacitance and their primary constants are related in accordance with Equations (16) and (17), the attenuation constant of the composite system is the sum of the products of the attenuation constants of the individual sections times their respective lengths, while the wave length constant of the composite system is the product of the wave length constant of the real line times the difference in the lengths. Thus the total propagation constant is $$\Gamma_t = \alpha D + \alpha' D' + j\beta(D - D') \qquad (18)$$

It is thus possible to make the composite system to function at the given frequency like a line of pure resistances by making D and D' equal, like a line of series inductance and shunt capacitance of any desired length less than D by making D' less than D or like a line of series capacitance and shunt inductance of any desired length by making D' greater than D.

As far as functioning at a single frequency is concerned, it is well known in the art that a smooth line may be replaced by an equivalent artificial line having lumped constants. This may be either a $\pi$ or a T structure. If a $\pi$ structure with two equal shunt admittances $Y_\alpha$ at each end and series impedance $Z_\alpha$ be chosen, these constants are related to the constants of the smooth line by the following well known formulae: (See A. E. Kennelly, "The Application of Hyperbolic Functions to Electrical Engineering Problems" University of London Press 1912, formulae (77) and (78) page 33).

$$Z_{\alpha}' = D'\left(R' - j\frac{1}{\omega C'}\right)\frac{\sin h\Gamma'D'}{\Gamma'D'} \qquad (19)$$

$$Y_{\alpha}' = \frac{1}{2}D'\left(G' - j\frac{1}{\omega L'}\right)\frac{\tan h\frac{1}{2}\Gamma'D'}{\frac{1}{2}\Gamma'D'} \qquad (20)$$

These may be transformed into $$Y_{\alpha}' = \frac{1}{Z_0}\tan h\frac{1}{2}\Gamma'D' \qquad (21)$$

$$Z_{\alpha}' = Z_0 \sin h\Gamma'D' \qquad (22)$$

Since $\Gamma' = \alpha' + j\beta' = \alpha' - j\beta$, by well known formulae of hyperbolic trigonometry these Equations (21) and (22) may be rewritten $$Y_{\alpha}' = \frac{1}{Z_0}\left[\frac{\sin h\alpha'D'}{\cos h\alpha'D' + \cos \beta D'} - j\frac{\sin \beta D'}{\cos h\alpha'D' + \cos \beta D'}\right] \qquad (23)$$

$$Z_{\alpha}' = Z_0(\sin h\alpha'D' \cos \beta D' - j \cos h\alpha'D' \sin \beta D') \qquad (24)$$

It will be evident therefore that by proportioning $Z_{\alpha}'$ and $Y_{\alpha}'$ to the constants of the transmission line and the desired value of D' by the use of Equations (23) and (24) the combination of the transmission line of the length D and artificial line may be made to have the phase change of a transmission line of a length D—D'.

It will be understood that this correcting apparatus may be connected at either the sending or the receiving end of the transmission line or that the transmission line may be divided into a plurality of sections with correcting apparatus connected between the adjacent sections. When the correcting apparatus is placed at one or the other end of a section of the transmission line, the apparatus may be said to be in tandem with the section of line. In order that the wave length factor of the combination shall be equal to the wave length factor of a line of the length D—D', where D is the total length of the line, the summation of the equivalent lengths of the sections of correcting apparatus must equal D'.

If desired, when a $\pi$ artificial line is used as the phase correcting means the shunt branch adjacent to the load may be omitted. This is equivalent in its effect to connecting in parallel with the load an admittance opposite in sign and equal in magnitude to the admittance of the omitted branch.

I will now disclose a number of examples of the application of my invention it being understood that the invention is defined in the appended claims:

Fig. 1 shows a diagram of a single-phase power transmission circuit comprising a generator 1, a step up transformer 2, a transmission line 3, phase corrective apparatus 4, consisting of a series branch 8 comprising a transformer 9 associated with capacitance 10, and inductance shunts 7, step down transformer 5 and load 6.

The line has the following constants:

| | | | |
|---|---|---|---|
| Length | D | 250 | miles |
| Resistance | R | 0.079 | ohms per mile |
| Inductance | L | 0.00196 | henrys per mile |
| Conductance | G | 0.56 | micromhos per mile |
| Capacitance | C | 0.0153 | microfarads per mile |
| Frequency | f | 60. | cycles per second |
| $2\pi f = \omega$ | | 377 | |
| Characteristic impedance | $Z_0$ | $358 - j1.8$ | ohms |
| Attenuation constant | $\alpha$ | 0.00021 | per mile |
| Wave length constant | $\beta$ | 0.00206 | per mile |

Choosing $D'$ as 250 miles and letting the effective resistance of $Z\alpha$ be 2 per cent., the correcting apparatus has the following constants:

| | | |
|---|---|---|
| Series branch, 8 | $Z\alpha'$ | $3.5 - j177.3$ ohms |
| Shunt branches, 7 | $Y\alpha'$ | $24.7 - j739$ micromhos |
| Attenuation constant | $D'\alpha'$ | 0.014 |
| Wave length constant | $D'\beta'$ | $-0.517$ |

The combination of the transmission line and the correcting apparatus has the following characteristics:

| | |
|---|---|
| Characteristic impedance | $358 - j1.8$ |
| Attenuation constant $D\alpha + D'\alpha'$ | 0.066 |
| Wave length constant $D\beta + D'\beta'$ | 0 |

When the load 6 is zero the voltage on the high sides of transformers 2 and 5 will be practically the same, while the charging current supplied by the generator 1 will be negligible. Only the power losses of the system will need to be supplied which will be small compared to the power rating of the generator. With a load there will be a drop in voltage due to the resistance losses but this drop will be very small compared to that which would occur on the line without the correcting means.

If $D'$ be taken as 275 miles the corrective apparatus will have the following constants.

| | | |
|---|---|---|
| Series branch, 8 | $Z'\alpha$ | $3.9 - j193.0$ ohms |
| Shunt branches, 7 | $Y'\alpha$ | $28.8 - j816.0$ micromhos |
| Attenuation constant | $D'\alpha'$ | 0.0162 |
| Wave length constant | $D'\beta'$ | 0.568 |

The combination of the transmission line and the phase correcting apparatus will have the following characteristics:

| | |
|---|---|
| Characteristic impedance | $358 - j1.8$ |
| Attenuation constant $D\alpha + D'\alpha'$ | 0.068 |
| Wave length constant $D\beta + D'\beta'$ | $-0.052$ |

When the load 6 has a lagging power factor the effect of the negative wave length factor of this combination will be to counteract the resistance drop or attenuation factor and to permit the transmission of a large amount of power with substantially equal voltages on the high sides of transformers 2 and 5.

The lengths of uncorrected line chosen for the above examples are each a fraction of a quarter wave length.

In Fig. 2 I show a line 3 and phase-correcting apparatus 11, the correcting apparatus comprising a shunt branch 12 and two series branches 13.

In Fig. 3 I show a combination of a generator 1, a section of transmission line 14, correcting apparatus 15, a second section of transmission line 14, a second section of correcting apparatus 15, and load 6.

In Fig. 4 I show one way in which my invention may be applied to a three-phase power-transmission circuit. This figure includes a three-phase generator 16, step up transformers 17, with their primaries in delta and their secondaries in star, extended transmission line 18, correcting apparatus 19, comprising six delta-connected shunt branches 22 and series transformers 23 associated with three capacitances 24, star-delta connected step-down transformers 20 and load 21.

I claim:

1. In combination, a source of power, a step-up transformer, a transmission line, phase-correcting apparatus comprising two shunt reactances and a series transformer, associated with a capacitance, a step-down transformer and a load, said phase-correcting apparatus having a characteristic impedance equal to the characteristic impedance of the transmission line and a wave-length constant opposite to the wave-length constant of the transmission line.

2. In combination, a source of power, a transmission line, phase correcting apparatus consisting of lumped impedances connected in series and shunt to the line, said correcting apparatus having a characteristic impedance substantially equal to the characteristic impedance of the transmission line and wave length constant opposite in sign to the wave length constant of the transmission line, a step-down transformer and a load.

3. In combination, a source of power, a step-up transformer, a transmission line, phase correcting apparatus comprising an inductance in shunt to the line and a capacity in series with the line, a step-down transformer and a load, said phase correcting apparatus having a characteristic impedance substantially equal to the characteristic impedance of the transmission line and a wave length constant opposite in sign to the wave length constant of the transmission line.

4. In combination, a source of power, an extended transmission line, a load, and phase correcting apparatus forming an artificial line with lumped constants connected in shunt and series with the transmission line, said artificial line having a characteristic impedance substantially equal to that of the transmission line and said artificial line having a wave length constant of opposite sign to that of the transmission line.

5. In a system of electrical wave transmission, a non-uniform wave-conductor consisting of a conductor having capacity reactance sources in series relation and inductive reactance sources in shunt relation distributed at points along its length in such manner that the resulting wave conductor is equivalent, within proper limits, to its corresponding uniform conductor but of reduced effective series reactance and of increased shunt reactance, substantially as described.

6. In combination an extended power transmission line with capacitative reactance in series with the line and inductive reactance in shunt to the line, said reactances being proportioned to each other and to the constants of the transmission line so that throughout changes in load the line voltage and current at one part of the combined system are substantially in phase respectively with the line voltage and current at a distant part of the combined system.

7. In a system of electrical wave transmission, a non-uniform wave conductor consisting of a uniform conductor having capacity reactance sources in series relation and inductive reactance sources in shunt relation, distributed at points along its length in such a way as to give with inductance, reactance and capacity of a uniform conductor, a predetermined inductance reactance and capacity per unit length, the distance between the interposed reactances being adjusted in such a way as to equal a fractional part of one quarter of the wave length which is to be transmitted.

8. In combination an extended power transmission line with capacitative reactance in series with the line and inductive reactance in shunt to the line, said reactances being proportioned to each other and to the constants of the transmission line so that the resultant system is equivalent within proper limits to a transmission line of substantially reduced effective series reactance and substantially increased effective shunt reactance.

RALPH G. McCURDY.